(No Model.)
T. A. NAYLOR.
ICE CREAM FREEZER.
No. 312,287. Patented Feb. 17, 1885.
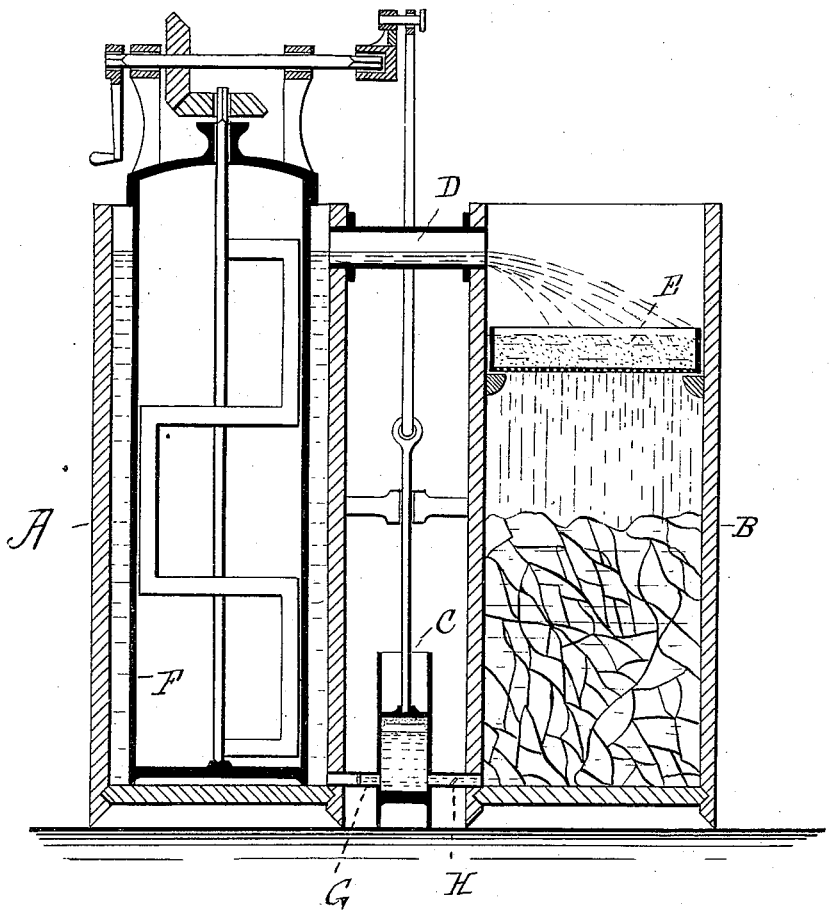
Witnesses:
J. Mason Goszler
Wm T Jones
Thomas A. Naylor.
Inventor:
per Goszler & Williams
attorneys
N. PETERS, Photo-Lithographer, Washington, D. C.

UNITED STATES PATENT OFFICE.

THOMAS A. NAYLOR, OF BALTIMORE, MARYLAND.

ICE-CREAM FREEZER.

SPECIFICATION forming part of Letters Patent No. 312,287, dated February 17, 1885.

Application filed January 19, 1885. (No model.)

*To all whom it may concern:*

Be it known that I, THOMAS A. NAYLOR, of Baltimore city, State of Maryland, have invented certain new and useful Improvements in Ice-Cream Freezers, of which the following is a specification, reference being had to the accompanying drawing, forming part hereof.

My invention relates to freezing-machines such as are used for freezing various substances wherein the freezing agent is produced by a combination of ice and salt. The manner of freezing ice-cream, &c., by means of this mixture is to have a tub considerably larger than the can in which the ice-cream is frozen. You place the can in the tub centrally located, and then pack alternate layers of chipped ice and salt around the can until you have filled the annular space. The combination of the ice and salt forms a liquor that is reduced to a very low temperature. This liquor conducts the heat from the cream that has been placed within the can, and thereby causes it to congeal. As it is impracticable to freeze ice-cream without said liquor, it is necessary to wait until sufficient liquor has formed to rise around the can, thereby causing considerable loss of time; also, each new freeze requires new ice and salt and loss of time for the liquor to form.

In my invention I aim to save time, salt, and ice, and I accomplish this in the following manner: I arrange my can centrally within the tub, leaving only a very narrow annular space around the can, preferably about one inch. I then take another tub of proper size, in which I support a pan by means of brackets being fastened to the inside of the tub at the proper place, and the said pan having perforated bottom and lid. I then place a pump in connection with the two tubs, so arranged as to draw the freezing liquor from near the bottom of one tub and force it into the other near the bottom. I also arrange an overflow-pipe near the top of said tubs, in order that the liquor may flow from one tub to the other.

My method of operating this machine is as follows: I fill the space below the pan in tub A with broken ice. I fill the pan with salt and set it on the bracket, covering the salt with the lid, and then pour enough water on the lid to fill the annular space around the can in tub B. The lid being perforated, the water will drip through said perforations and mingle with the salt contained in the pan, dissolving the necessary amount, and then dripping through the perforations in the bottom of the pan, it comes in contact with the ice, and immediately the chemical action begins, which reduces the brine thus formed to a very low temperature. Thus I form my freezing-mixture separate from my can, and time is saved both in the chipping of the ice and the adjusting of it for a freeze.

Having placed the material to be frozen within the can, and having placed the can properly within the tub B, I commence operating my beater and pump by means of suitably-arranged mechanism. The operation of the pump causes the freezing-liquor to be drawn from the tub B at or near the bottom, and in a very short time sufficient liquor has been forced in to fill the annular space, thereby causing the freezer to act immediately over the entire surface of the can from the bottom to the top. The annular space having become full of the freezing-liquor to overflow through the above-mentioned overflow-pipe, said pipe being so arranged as to cause the liquor to fall on top of the lid, whence it is distributed evenly over the salt contained in the pan, and here again comes in contact with the salt and absorbs as much of it as said liquor can carry in solution. The liquor then drips through the perforations in the bottom of the pan and again comes in contact with the ice, the chemical action is renewed, and all the heat that has been conducted from the material in the can is again reduced, and thus the action continues, the liquor carrying no more salt than it can dissolve, nothing is wasted, and a more intimate and perfect combination can be formed with the ice, thereby hastening the process of freezing.

When more than one freeze is to be made, the economy is more apparent, as the freezing-liquor is already formed, and requires but to draw off a part of the liquor and refill the space with broken ice and the pan with salt. Thus without any interruption the freeze is perpetuated for an indefinite time. I also gain time in transferring the frozen material from the freezing-can to the packing-can, as the freezing-can can be lifted out of the tub and the frozen material more easily and conveniently removed therefrom without any disarrangement of the remaining ice and salt, while to do this with the machines now in use would cause trouble and annoyance.

Ice-cream freezers as now constructed generally rotate the can while making a freeze, in order to cause an agitation of the ice and salt and to present new surface in contact with the liquor, said rotation being the chief cause of wear on the cans on account of the scouring by the chipped ice and salt having been packed tightly in the annular space around the can. I overcome this trouble by fixing my can stationary within the tub, and, instead of rotating the can in the freezing-mixture, I cause the freezing-mixture to circulate around the can in the annular space by directing it obliquely from the pump.

Another source of annoyance and trouble, and sometimes loss, is the presence of ice and salt around the top of the can, great care and cleanliness being necessary in removing the cover from the can, in order that no salt or other foreign matter drop into the material contained therein. With my freezer no such trouble is caused, as the ice and salt are in the generating-tub and the cover of the freezing-can is perfectly clean; also, the can being stationary in the tub, it does not float.

Having thus described my invention, what I claim is—

1. The combination of tubs A and B with the pump C, overflow D, and salt-pan E, all arranged substantially in the manner shown and described.

2. The combination of tub A, stationary can F, and water-ingress G, substantially as set forth.

3. The combination of tub B, salt-pan E, arranged above the ice, and water-outlet H, substantially in the manner as set forth.

THOS. A. NAYLOR.

Witnesses:
WM. B. NELSON,
J. MASON GOSZLER.